United States Patent
Fish

(10) Patent No.: US 8,051,664 B2
(45) Date of Patent: Nov. 8, 2011

(54) PRE-LOADED INTERNAL FUEL MANIFOLD SUPPORT

(75) Inventor: Jason Fish, Brampton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 908 days.

(21) Appl. No.: 11/781,525

(22) Filed: Jul. 23, 2007

(65) Prior Publication Data

US 2009/0025687 A1  Jan. 29, 2009

(51) Int. Cl.
F02C 7/20 (2006.01)
F02C 7/22 (2006.01)
(52) U.S. Cl. ............... 60/800; 60/739; 60/740
(58) Field of Classification Search ............ 60/800, 60/739, 740
See application file for complete search history.

(56) References Cited

U.S. PATENT DOCUMENTS

| | | |
|---|---|---|
| 1,081,950 A | 12/1913 | Eller |
| 2,443,373 A | 6/1948 | Borsoff |
| 4,332,626 A | 6/1982 | Hood et al. |
| 4,377,420 A | 3/1983 | Granatek et al. |
| 4,438,626 A * | 3/1984 | Berestecki ............ 60/800 |
| 4,472,133 A | 9/1984 | Petersen et al. |
| 4,683,717 A * | 8/1987 | Naud ............ 60/797 |
| 4,703,888 A | 11/1987 | Kawamura et al. |
| 5,771,696 A | 6/1998 | Hansel et al. |
| 5,797,266 A | 8/1998 | Brocard et al. |
| 5,938,402 A | 8/1999 | Bochud et al. |
| 5,944,483 A | 8/1999 | Beck et al. |
| 6,503,334 B2 | 1/2003 | Ruiz et al. |
| 6,712,080 B1 | 3/2004 | Handschuh et al. |
| 7,028,484 B2 * | 4/2006 | Prociw et al. ............ 60/772 |
| 2006/0104809 A1 * | 5/2006 | Fish et al. ............ 415/208.3 |
| 2006/0156733 A1 | 7/2006 | Prociw et al. |
| 2006/0277913 A1 * | 12/2006 | Fish ............ 60/739 |

OTHER PUBLICATIONS

U.S. Appl. No. 11/151,644, Fish.
U.S. Appl. No. 11/465,655, Morenko.
U.S. Appl. No. 11/488,801, Fish et al.
U.S. Appl. No. 11/513,030, Morenko et al.
U.S. Appl. No. 11/534,246, Morenko et al.
U.S. Appl. No. 11/534,243, Patel et al.
U.S. Appl. No. 11/535,185, Morenko et al.
U.S. Appl. No. 11/552,240, Patel et al.
U.S. Appl. No. 11/552,249, Fish et al.
U.S. Appl. No. 11/749,230, Fish et al.

* cited by examiner

Primary Examiner — Ted Kim
(74) Attorney, Agent, or Firm — Norton Rose OR LLP

(57) ABSTRACT

A system for mounting an internal fuel manifold within a gas generator case of a gas turbine engine includes at least one fastener support assembly having a fastener pin and at least one receiving element, respectively engaged to either the internal fuel manifold or the gas generator case. A biasing member is located between the fastener pin and the receiving element to axially preload the joint between the fastener pin and the receiving element, such as to constrain relative movement between the two parts in an axial direction while allowing relative movement in a radial direction.

18 Claims, 5 Drawing Sheets

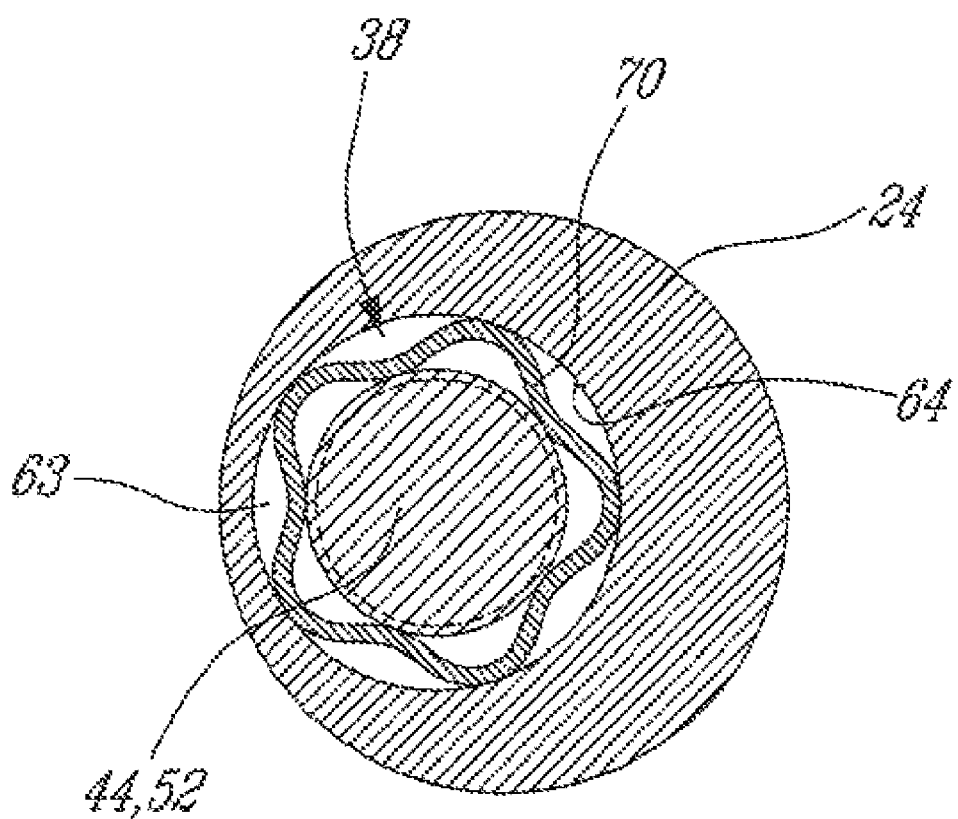

US 8,051,664 B2

PRE-LOADED INTERNAL FUEL MANIFOLD SUPPORT

TECHNICAL FIELD

The invention relates generally to an internal fuel manifold for a gas turbine engine and, more particularly, to an improved mounting system for such an internal fuel manifold.

BACKGROUND OF THE ART

Gas turbine engine internal fuel manifolds are typically located inside the gas generator case adjacent the engine combustor, and thus reside in an extremely hot environment. As is typical with other hardware mounted inside a gas turbine engine, the internal fuel manifold must generally be mounted such as to allow for thermal expansion of the manifold and accommodate mismatches in thermal expansion which may exist between components made of different materials.

However, in order to ensure that the support structure for the internal fuel manifolds is able to accommodate differential thermal growth, the fit between the internal fuel manifold itself and its supporting structure has been found to be too generous, thereby allowing excessive play which risks eventually leading to unwanted fretting during engine operation.

Accordingly, improvements are desirable.

SUMMARY

It is therefore an object to provide an improved mounting system for an internal fuel manifold of a gas turbine engine.

In one aspect, there is provided a system for mounting an internal fuel manifold within a gas generator case of a gas turbine engine, the system comprising at least one fastener support assembly and at least one receiving element, one of the fastener support assembly and the receiving element being engaged to the internal fuel manifold and the other of the fastener support assembly and the receiving element being engaged to the gas generator case, each fastener support assembly including a fastener pin engaging an opening in the receiving element such as to allow a relative movement in a radial direction, and a biasing member disposed between the fastener pin and the receiving element, the biasing member axially preloading a joint between the fastener pin and the receiving element such as to constrain relative movement between the fastener pin and the receiving element in an axial direction, thereby constraining relative axial movement between the internal fuel manifold and the gas generator case.

In another aspect, there is also provided a mounting system for an annular internal fuel manifold disposed within a gas generator case of a gas turbine engine, the mounting system comprising at one pin and at least one cooperating lug, the pin having an outer end engageable to the gas generator case and an inner end projecting radially inwardly when the outer end is engaged to the gas generator case, the lug being disposed on the fuel manifold in alignment with the pin and having an opening defined therein, at least the inner end of the pin being received within the opening such that relative sliding displacement between the pin and the lug is permitted along a longitudinal axis of the pin, and a biasing member disposed within the opening between the pin and the lug, the biasing member axially preloading a joint between the pin and the lug such as to constrain relative movement between the pin and the lug in an axial direction, thereby constraining relative axial movement between the internal fuel manifold and the gas generator case.

In a further aspect, there is provided a fuel injection system for gas turbine engine, comprising: an annular internal fuel manifold disposed adjacent a combustor of the engine within a surrounding gas generator case, the fuel manifold having at least one fuel conveying passage therein in fluid flow communication with a plurality of fuel injection nozzles disposed around the fuel manifold and adapted to spray fuel into the combustor; and a mounting system supporting and positioning the fuel manifold relative to the combustor within the gas generator case, the mounting system including three support points, at least two of said three support points including a support assembly disposed between the fuel manifold and the gas generator case, each said support assembly including an elongated fastening element and a cooperating receiving element which form a mating joint therebetween, a biasing member being disposed between the fastening element and the receiving element at the joint, the biasing member axially preloading the joint between the pin and the lug such as to constrain relative movement between the internal fuel manifold and the gas generator case in an axial direction while permitting radial displacement therebetween due to thermal size change.

Further details of these and other aspects of the present invention will be apparent from the detailed description and figures included below.

DESCRIPTION OF THE DRAWINGS

Reference is now made to the accompanying figures depicting aspects of the present invention, in which:

FIG. 5 is a cross-sectional view taken through line 5-5 of FIG. 4.

DETAILED DESCRIPTION OF THE PREFERRED EMBODIMENTS

Figure 1:
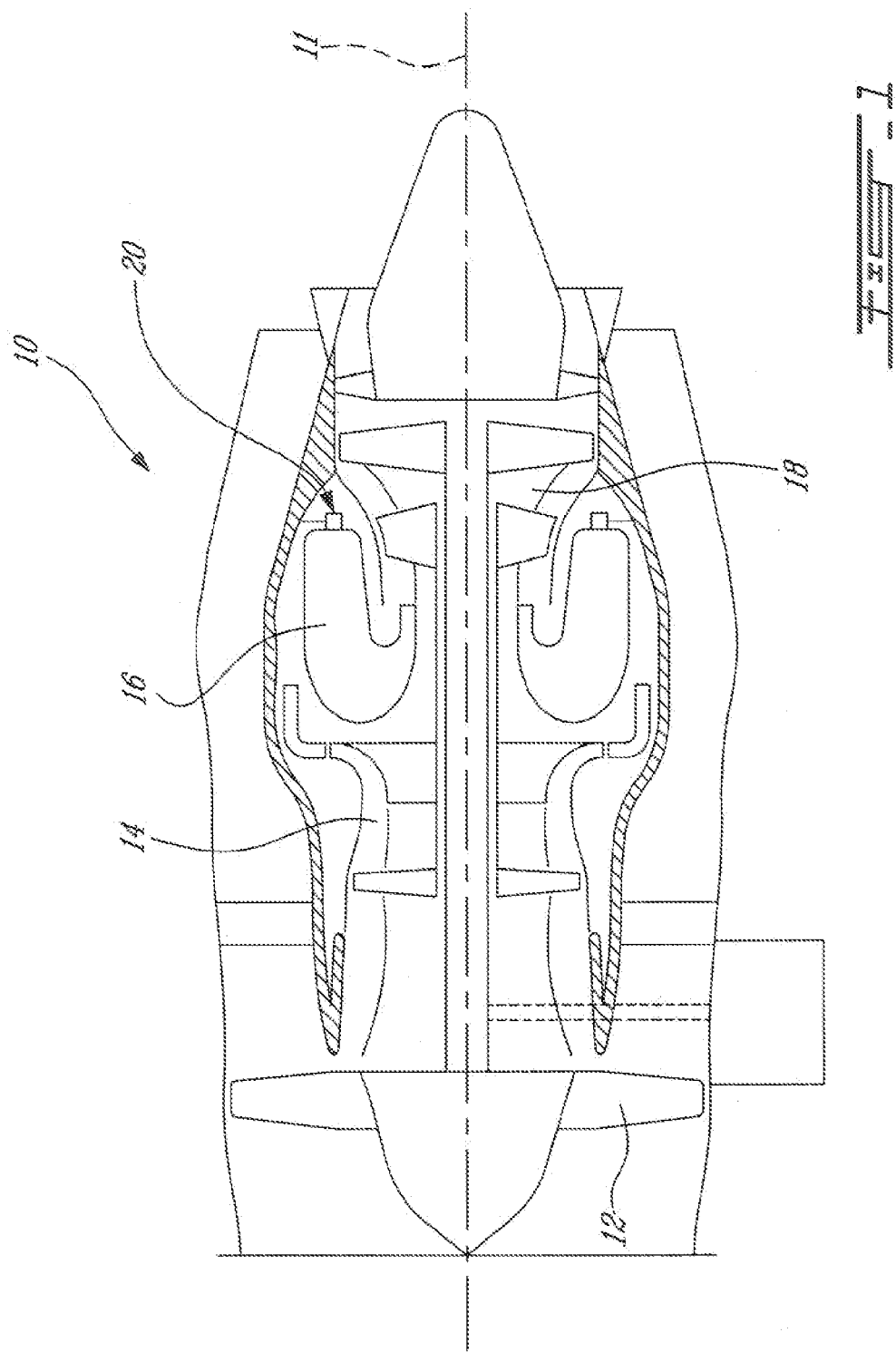
FIG. 1 is schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Fuel is injected into the combustor 16 of the gas turbine engine 10 by a fuel injection system 20 which is connected in fluid flow communication with a fuel source (not shown) and is operable to inject fuel into the combustor 16 for mixing with the compressed air from the compressor 14 and ignition of the resultant mixture. The fan 12, compressor 14, combustor 16, and turbine 18 are preferably all concentric about a common central longitudinal axis 11 of the gas turbine engine 10.

Figure 2:
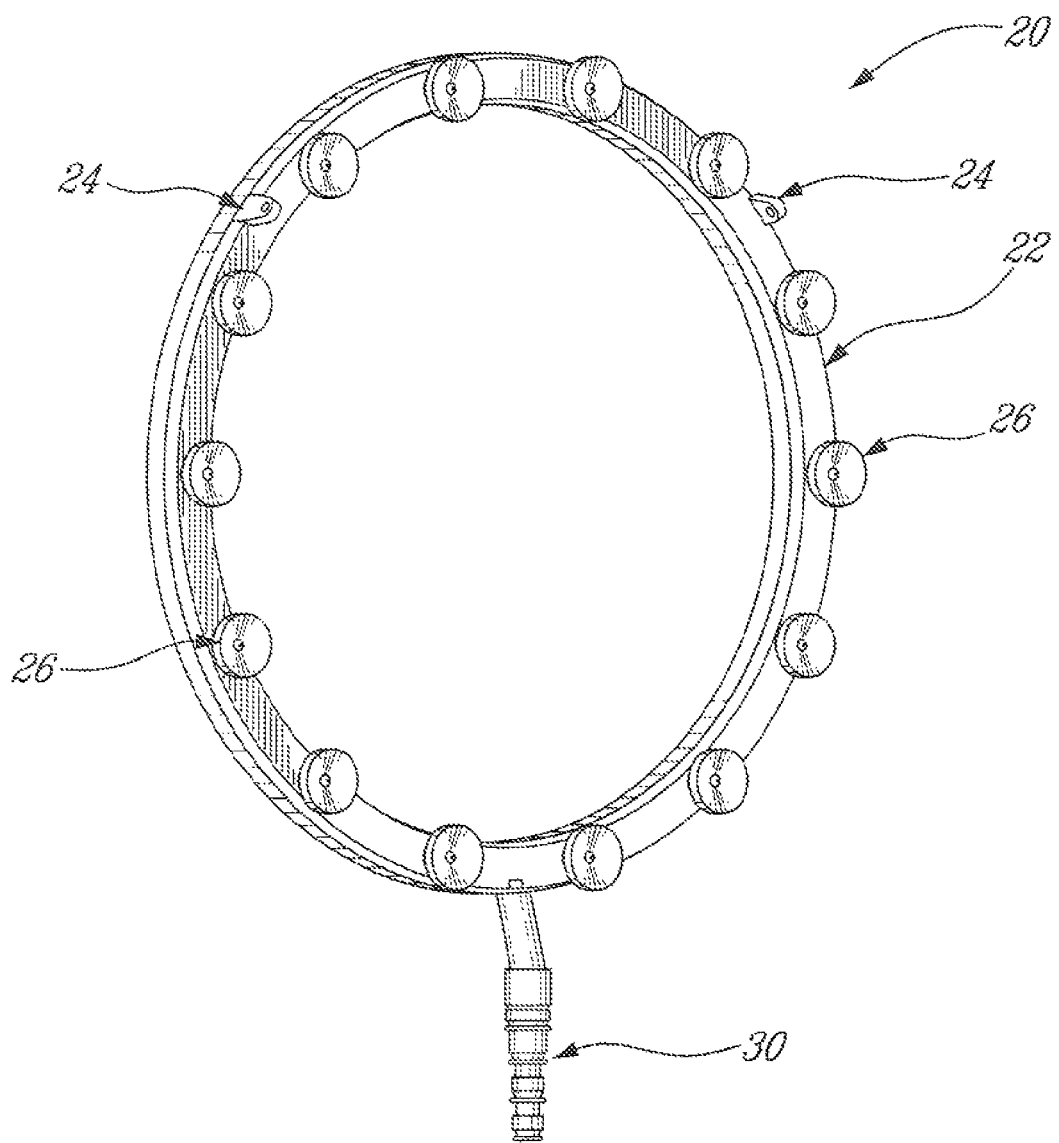
FIG. 2 is an isometric view of an internal fuel manifold for use in a gas turbine engine such as that depicted in FIG. 1.

Referring to FIG. 2, the fuel injection system 20 includes at least one fuel conveying member through which fuel flows. In the exemplary embodiment, the fuel injection system includes an annular fuel manifold ring 22 and a plurality of fuel injecting nozzle assemblies 26 provided about the circumference of the fuel manifold ring 22. The nozzle assemblies 26 atomize the fuel as it is injected into the combustor 16 for ignition when mixed with the compressed air. Fuel enters the annular fuel manifold ring 22 via a fuel inlet tube 30, and is circumferentially distributed within the manifold ring 22 such that fuel flow is provided to each of the nozzles assemblies 26. Both the fuel manifold ring 22 and the nozzle assemblies 26 therefore constitute fuel conveying members.

Figure 3:
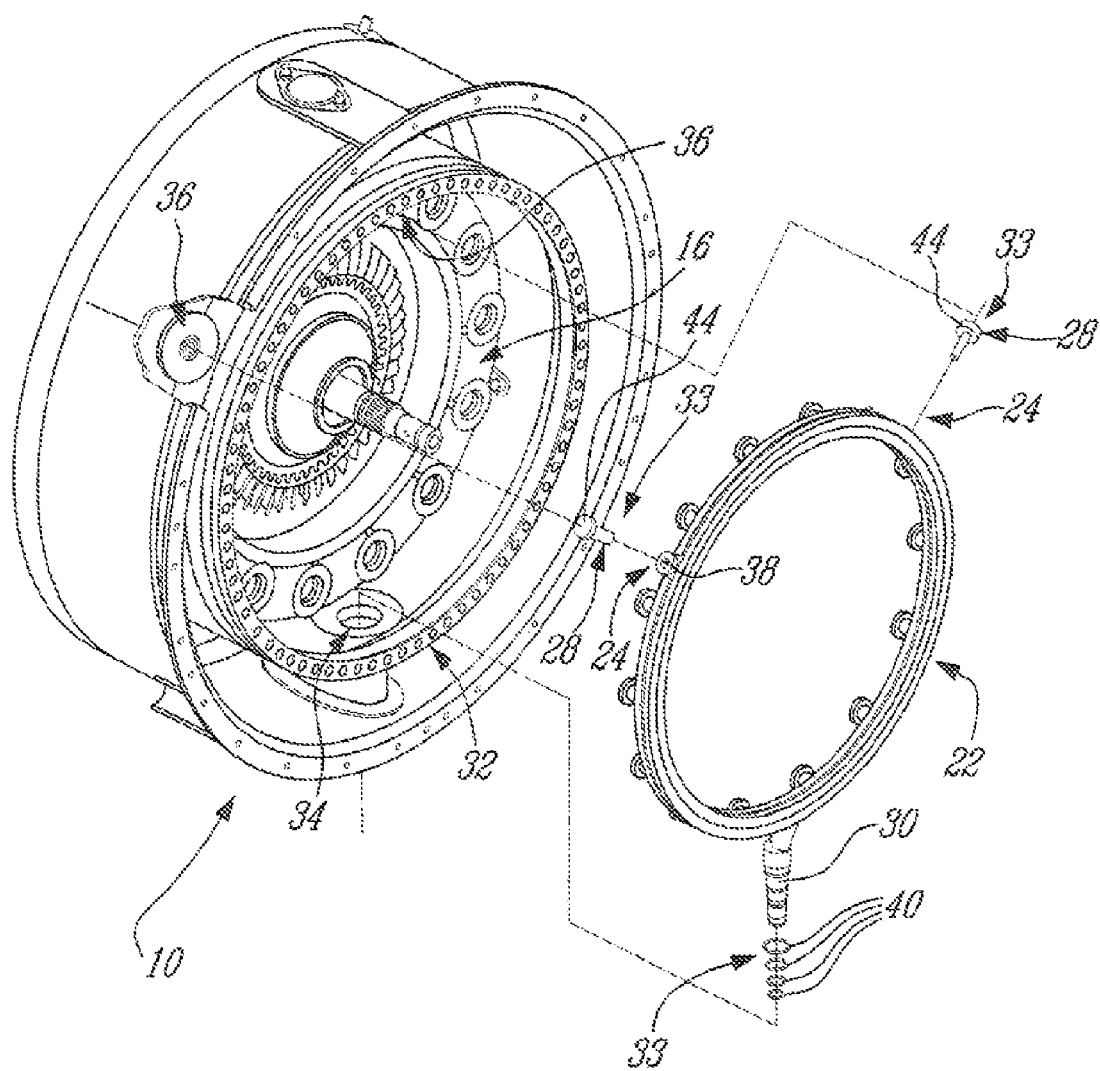
FIG. 3 is an exploded isometric view of a portion of a gas turbine assembly including the fuel manifold of FIG. 2 incorporating a mounting system in accordance with a particular embodiment of the present invention.

Referring to FIG. 3, the fuel manifold ring 22 is installed adjacent to the combustor 16 by a mounting system supporting and positioning the fuel manifold ring 22 within a gas generator case 32 of the gas turbine engine 10. In a particular embodiment, the mounting system includes three support points 33 preferably equally spaced apart about the circumference of the annular fuel manifold (i.e. spaced 120 degrees apart) such as to define a Y-shaped support configuration, in order to help balance radial and axial loads between the three support points 33. However, it is to be understood that other configurations and number of support points 33 are also possible. In the embodiment shown in FIG. 3, the support points 33 include two fastener support assemblies 28 and the fuel inlet tube 30, which is received radially within a boss 34 in the gas generator case 32. This mounting system allows for thermal expansion of the fuel manifold ring 22 at high temperatures.

The lower portion of the manifold ring 22 is thus supported within the gas generator case 32 by the inlet tube 30, which acts as one of the three support points 33. A plurality of o-rings 40 are provided around the inlet tube 30 for sealing and the inlet tube 30 is received within a bushing in the boss 34 and held therein by a loose fit, such that sliding radial displacement of the inlet tube 30 within the bushing of the case 32 is allowed. As such, radial growth between the fuel manifold ring 22 and the surrounding case 32 is permitted at the inlet tube 30. In a particular embodiment, the inlet tube is identical to that described in U.S. patent application Ser. No. 11/488,801 filed Jul. 19, 2006, the contents of which is incorporated herein by reference.

In the embodiment shown, the inlet tube 30 is located at the bottom or lower most point (i.e. the 6 o'clock position) of the annular fuel manifold 22 when the engine 10 is horizontal, such as when the engine 10 is disposed in a normal flight attitude position for example, as shown in FIG. 3. Alternate locations for the inlet tube 30 are also possible.

Referring again to FIG. 3, the upper portion of the manifold ring 22 is supported within the gas generator case 32 by the remaining two support points 33, each being defined by a fastener support assembly 28. Each fastener support assembly 28 includes a radially extending fastening element 44, such as a pin, that is removably engaged at a first end thereof with the case 32, such as by being threadably fastened to a boss 36 defined in the case 32. The fastening element 44, when fastened to the case 32, radially extends inwardly therefrom and is receiving within a mating receiving element 24, such as an attachment lug, provided on the manifold ring 22. In the embodiment shown, each attachment lug 24 is fixed to the manifold ring 22 and defines a radially extending opening 38 therethrough within which a second end of the pin 44, opposite the first end thereof, is received.

Axial and radial loads for supporting the fuel manifold ring 22 can be home by all the three support points 33, which are defined by the interaction of the fuel inlet tube 30 with the boss 34 and by pin/lug interaction of each fastener support assembly 28. That is, the weight of the fuel manifold ring 22 is distributed about the three support points 33, as are any other forces acting on the fuel manifold ring 22, such as fuel pressure, vibrations, engine loads, etc.

Figure 4:
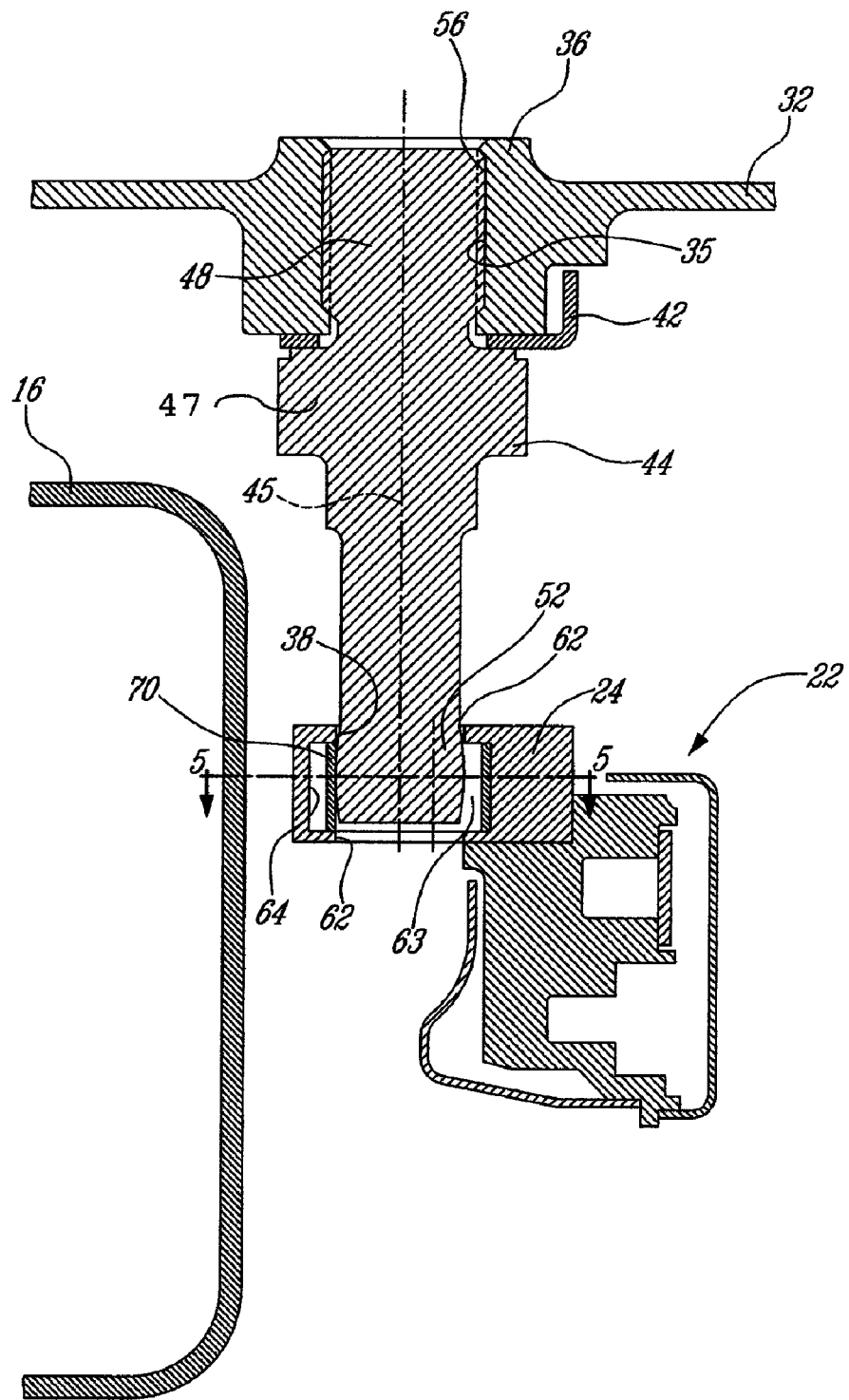
FIG. 4 is a cross-sectional view of part of the mounting system of FIG. 3.

Referring now to FIG. 4, the structure of the mounting system used to mount the internal fuel manifold 22 adjacent the combustor 16 within the surrounding gas generator case 32 will be described in greater detail. Each support pin 44 includes an outer end 48 which is engaged in a corresponding opening 35 of the boss 36 defined in the gas generator case 32. As seen in FIG. 4, the radially outer end 48 of the pin 44 is received, from inside the gas generator case 32, into the internally-facing opening 35 of the boss 36 in the gas generator case 32 and the pin 44 has a protruding flange 47 and is located within the surrounding gas generator case 32. As is evident from FIG. 4, the protruding flange 47 of the pin 44 is larger than the opening 35 of the boss 36, such that the flange 47 prevents radially outward removal of the pin 44 through the boss opening 35 and the pin 44 is thereby removable from the gas generator case 32 only from the inside thereof. The engagement between the pin 44 and the case 32 is in the present embodiment a threaded one, such as to permit removal and replacement of the pin 44 is required. Thus, the opening 35 of the boss 36 includes a threaded portion 56 and the outer end 48 of the pin 44 is threaded for engagement with the threaded portion 56 of the boss opening 35. However, other engagement means to fasten the pin 44 to the case 32 are also possible. In the depicted embodiment, the pin 44 is prevented from unwanted rotation by an anti-rotation ring 42, which is mounted to the pin 44 and engages the boss 36 of the case 32 such as to prevent or limit rotation of the pin 44 within the case.

The pin 44 includes a free inner end 52 which extends radially inwardly from the case 32 and is adapted to pass generally radially through the opening 38 which is defined in the lug 24 of the fuel manifold ring 22. The opening 38 in the lug 24 is preferably in substantial alignment with the pin 44 and has a shape corresponding to the cross-sectional shape of the pin 44. Although in the present embodiment both the pin 44 and the lug opening 38 are substantially circular, other shaped pins and openings are also possible, such as oval, hexagonal, etc. The circular opening 38 of the lug 24 therefore defines a center point which is coincident with a central axis 45 of pin 44.

The opening 38 within each lug, 24 includes two outer portions 62 defined at each of the opposed sides of the lug 24 and an inner portion 64 defined between the two outer portions 62. The inner portion 64 of the opening 38 has a larger diameter than the outer portions 62, so that the opening 38 is stepped such as to define an inner recessed region 63. More specifically, the outer portions 62 of the lug's opening 38 preferably have a diameter substantially the same as the inner end 52 of the pin 44, but being just slightly larger than the pin's diameter such as to permit the pin to slide through the opening (i.e. in a radial direction relative to the case and along the axis 45 of the pin), while nonetheless having reasonably close clearances therebetween such that relative axial movement (relative to the case) is limited. Thus, the interaction between the pin 44 and the lug 24 allows for relative radial sliding displacement between the manifold ring 22 and the case 32, which constraining their relative axial movement.

A biasing member 70 is disposed within the inner recess 63 of the lug 24, in contact with both the inner portion 64 and the outer surface of the pin's inner end 42. The biasing member 70 is radially retained within the inner recess 63 by the opposed outer portions 62 of the opening 38 in the lug 24. The biasing member 70 acts inwardly on the inner end 52 of the pin 44 such as to preload the interface or joint between the lug 24 and the pin 44, so that axial freedom is reduced while still permitting freedom for the pin 44 to slide in the radial direction such as to be able accommodate any differential thermal growth between the casing 32 and the fuel manifold 22. The biasing member 70 is preferably an annular elastic element, such as a wave spring (otherwise known in the art as a "Marcel expander") or leaf spring for example. In the embodiment depicted in FIGS. 4-5, the biasing member 70 is an annular wave spring (or Marcel expander), which acts to bias the pin 44 towards the center of the opening 38 of the lug 24, thereby limiting axial freedom of the pin 44 relative to the lug and therefore the fuel manifold. This is much easier and more cost effective than trying to achieve the same result (i.e. the axial restriction of the pin) without such a spring, such as by attempting to significantly reduce the tolerances between the pin and the lug opening in order to achieve a tighter assembly. As noted above, the loose fit between lugs of the internal fuel manifold and the supporting pins in prior art systems is often required to facilitate assembly thereof, and this loose fit has been found to be too generous thereby allowing excessive play which can subject the pins to fretting wear daring engine operation. Accordingly, the use of a biasing member 70, such as the wave spring depicted, in the present mounting system structure allows sufficient radial sliding displacement between the pins 44 and the lugs 24 of the fuel manifold 22 in order to allow for thermal growth mismatches, while axially retaining the movement of the pins thereby reducing the likely of undue fretting wear occurring on the pins.

The terms radial and axial loads as used herein are understood to mean loads which the support points 33 must bear in the radial and axial directions relative to the engine axis 11 in order to adequately support the fuel manifold ring 22 in a correct position within the gas generator case 32 in relation to the combustor 16. In normal flight attitude, the weight of the manifold ring 22 is generally supported by the fastener support assemblies 28 as well as by the inlet tube 30, although the fastener support assemblies 28 support a majority of the weight of the manifold ring 22 during normal engine operation, at least partially due to their angled orientation.

Each of the three support points 33 allows for relative thermal size change (i.e. thermal growth and/or reduction) between the fuel manifold ring 22 and the gas generator case. Accordingly, the radially sliding fit between the pins 44 and the lugs 24 and between the fuel inlet tube 30 and the mating bushing of the case 32 allow the ring 22 to thermally grow and shrink radially (i.e. with reference to the engine axis 11), without introducing any significant stress on the inlet tube 30 or the lugs 24, while axially constraining the fuel manifold ring 22 within the case 32.

In an alternate embodiment, the inlet tube 30 is not load bearing, i.e. does not provide one of the support points 33, and each of the support points 33 is instead provided by a respective pin and lug assembly, and preferably by a fastener support assembly 28 comprising the pins 44 as described above.

In the embodiment shown, the support points 33 are thus limited to three points located within a common axial plane (i.e. with reference to the engine axis 11) within the gas generator case 32 such as to fix the axial location of the fuel manifold ring 22 within the case 32, as three represents the minimal number of support points required to define an axial plane within which the fuel manifold must be located. As such, (see FIG. 3) the fastener support assemblies 28, as well as the inlet tube 30 when the inlet defines a support point 33, are located within a common axial plane. Accordingly, the number of support points 33 for the fuel manifold ring 22, the load on each support point 33, and tolerance stack-ups can be minimised. The term "constraint" or "constraining" as used herein is intended to mean limiting movement and/or thermal size change, and as such the support points 33 are said to be axially constraining as they limit substantially axial movement or growth of the fuel manifold ring 22, while nonetheless allow displacement in a radial direction such as to accommodate radial thermal growth/shrinking.

The above description is meant to be exemplary only, and one skilled in the art will recognize that changes may be made to the embodiments described without department from the scope of the invention disclosed. For example, alternate configurations of the fuel conveying members such as the fuel manifold ring 22 and the nozzle assemblies 26 can be used. Other types of adequate fastening elements can be used instead or in addition to the pins 44, and other types of adequate receiving elements (e.g. features on the manifold ring, whether integral therewith or fixed thereto) can be used instead of the lugs 24, depending on the fastening elements used. The fastening elements can alternately be provided on the manifold and the receiving elements on the case. Although described with respect to airborne gas turbines, the invention may be applied to any suitable engine in a suitable application. Still other modifications which fall within the scope of the present invention will be apparent to those skilled in the art, in light of a review of this disclosure, and such modifications are intended to fall within the appended claims.

The invention claimed is:

1. A system for mounting an internal fuel manifold within a gas generator case of a gas turbine engine, the system comprising at least one fastener support assembly and at least one receiving element, the receiving element being engaged to the internal fuel manifold and the faster support assembly including at least one faster pin having a radially outer end engaged to the gas generator case and a radially inner end engaging an opening in the receiving element the radially outer end of the fastener pin being received form inside the gas generator case into an internally-facing boss opening in the gas generator case and having a protruding flange which is larger than said boss opening and disposed within the gas generator case, the receiving element defining a bore radially extending therethrough between radially opposed sides of the receiving element, the bore being stepped and defined by openings of a first size in outer portions thereof at each of the opposed sides of the receiving element and having an inner portion defined between the outer portions, the inner portion of the bore having a second size that is greater than the first size such that the stepped bore defines an axially recessed region within the receiving element, and a biasing member disposed within the recessed region of the receiving element and axially extending between the inner portion of the bore having the second size and the fastener pin, the biasing member being radially retained in place by the outer portions of the stepped bore, the biasing member axially preloading a joint between the fastener pin and the receiving element such as to constrain relative movement between the fastener pin and the receiving element in an axial direction but allow relative radial movement therebetween, thereby constraining relative axial movement between the internal fuel manifold and the gas generator case while permitting relative radial movement therebetween.

2. The system as defined in claim 1, wherein the biasing member includes a spring.

3. The system as defined in claim 2, wherein the spring is a wave spring.

4. The system as defined in claim 1, wherein the biasing member is annular.

5. The system as defined in claim 1, wherein the receiving element includes a lug, the lug defining said openings of the bore in the opposed sides of the receiving element, the openings being aligned with each other and the first size of said openings corresponding substantially to that of the fastener pin while nevertheless permitting mating engagement for relative sliding displacement therebetween.

6. The system as defined in claim 1, wherein the mounting system includes only three support points, two of the three support points being defined by the at least one fastener support assembly cooperating with the at least one receiving element.

7. The system as defined in claim 1, wherein outer end of the fastener pin is removably engaged to the gas generator case such that each said fastener pin is replaceable, the fastener pin being removable from the gas generator case only form a radial inside thereof.

8. A mounting system for an annular internal fuel manifold disposed within a gas generator case of a gas turbine engine, the mounting system comprising at least one pin and at least one cooperating lug, the pin having an outer end received form inside the gas generator case into an internally-facing boss opening in the gas generator case for engagement of the pin to the gas generator case, and an inner end of the pin projecting radially inwardly when the outer end is engaged to the gas generator case, the lug being disposed on the fuel manifold in alignment with the pin, the lug defining a bore radially extending therethrough between radially opposed sides thereof, the bore being stepped and defined by openings of a first size in outer portions thereof at each of the opposed sides of the lug and having an inner portion defined between the outer portions, the inner portion of the bore having a second size that is greater than the first size such that the stepped bore defines an axially recessed region within lug, at least the inner end of the pin being received within the openings of the bore in the lug such that relative sliding displacement between the pin and the lug is permitted along a longitudinal axis of the pin, and a biasing member disposed within the recessed legion of the lug and axially extending between the inner portion of the bore having the second size and the pin, the biasing member being retained in place in a direction of the longitudinal axis of the pin by the outer portions of the stepped bore, the biasing member axially preloading a joint between the pin and the lug such as to constrain relative movement between the pin and the lug in an axial direction but allow relative radial movement therebetween, thereby constraining relative axial movement between the internal fuel manifold and the gas generator case while permitting relative radial movement therebetween.

9. The mounting system as defined in claim 8, wherein the biasing member includes a spring.

10. The mounting system as defined in claim 9, wherein the spring is a wave spring.

11. The mounting system as defined in claim 8, wherein the biasing member is annular.

12. The mounting system as defined in claim 8, wherein the pin includes a protruding flange near the outer end thereof which is larger than said boss opening, the flange being disposed within the gas generator case to prevent radially outward removal of the pin through the boss opening.

13. The mounting system as defined in claim 8, wherein the outer end of the pin includes a thread cooperating with a corresponding threaded portion of the boss defined in the gas generator case and within which the outer end of the pin is received from within the gas generator case to engage the pin to the gas generator case.

14. A fuel injection system for gas turbine engine, comprising:
  an annular internal fuel manifold disposed adjacent a combustor of the engine within a surrounding gas generator case, the fuel manifold having at least one fuel conveying passage therein in fluid flow communication with a plurality of fuel injection nozzles disposed around the fuel manifold and adapted to spray fuel into the combustor; and
  a mounting system supporting and positioning the fuel manifold relative to the combustor within the gas generator case, the mounting system including three support points, at least two of said three support points including a support assembly disposed between the fuel manifold and the gas generator case, each said support assembly including an elongated fastening element and a cooperating receiving element which form a mating joint therebetween, a radially outer end of the elongated fastening element being received from inside the gas generator case into an internally-facing boss opening in the gas generator case, the receiving element defining a bore radially extending therethough between opposed sides of the receiving element, the bore being stepped and defined by openings of a first size in outer portions thereof at each of the opposed sides of the receiving element and having an inner portion defined between the outer portions, the inner portion of the bore having a second size that is greater than the first size such that the stepped bore defines an axially recessed region within the receiving element, biasing member being disposed within the recessed region of the receiving element and axially extending between the inner portion of the bore and the elongated fastening element, the biasing member being radially retained in place by the outer portions of the stepped bore, the biasing member axially preloading the joint between the elongated fastening element and the receiving element such as to constrain relative movement between the internal fuel manifold and the gas generator case in an axial direction while permitting radial displacement therebetween due to thermal size change.

15. The fuel injection system as defined in claim 14, wherein the elongated fastening element includes a pin having said outer end thereof detachably engaged to the gas generator case and the receiving element includes a lug engaged to the internal fuel manifold.

16. The fuel injection system as defined in claim 15, wherein the pin includes a protruding flange which is larger than said boss opening and disposed within the generator case, such that the flange prevents radially outward removal of the pin through the boss opening and the pin is thereby removable from the gas generator case only from the inside thereof.

17. The fuel injection system as defined in claim 14, wherein the biasing member includes a spring.

18. The fuel injection system as defined in claim 17, wherein the spring is an annular wave spring.

* * * * *